(12) United States Patent
Liu et al.

(10) Patent No.: US 12,260,594 B2
(45) Date of Patent: Mar. 25, 2025

(54) IMAGE PROCESSING DEVICE AND METHOD

(71) Applicants: Haining ESWIN IC Design Co., Ltd., Zhejiang (CN); Beijing ESWIN Computing Technology Co., Ltd., Beijing (CN)

(72) Inventors: Qingchun Liu, Zhejiang (CN); Haixia Xu, Zhejiang (CN)

(73) Assignees: Haining ESWIN IC Design Co., Ltd., Haining (CN); Beijing ESWIN Computing Technology Co., Ltd., Beijing (CN)

( * ) Notice: Subject to any disclaimer, the term of this patent is extended or adjusted under 35 U.S.C. 154(b) by 157 days.

(21) Appl. No.: 18/146,968

(22) Filed: Dec. 27, 2022

(65) Prior Publication Data

US 2023/0139719 A1    May 4, 2023

(30) Foreign Application Priority Data

Aug. 5, 2022    (CN) .......................... 202210944237.X

(51) Int. Cl.
*G06T 7/80* (2017.01)
*G06T 7/90* (2017.01)
*H04N 23/63* (2023.01)

(52) U.S. Cl.
CPC .................. *G06T 7/80* (2017.01); *G06T 7/90* (2017.01); *H04N 23/632* (2023.01)

(58) Field of Classification Search
CPC .... G06T 7/80; G06T 7/90; G06T 1/20; G06T 5/94; H04N 23/632; H04N 9/64
See application file for complete search history.

(56) References Cited

U.S. PATENT DOCUMENTS

| | | | | |
|---|---|---|---|---|
| 10,733,957 | B2 * | 8/2020 | Marcu | ........................ G06T 7/90 |
| 10,909,899 | B2 * | 2/2021 | Marcu | .................. G09G 3/2003 |
| 2014/0043369 | A1 * | 2/2014 | Albrecht | .............. G09G 3/2074 |
| | | | | 345/690 |

FOREIGN PATENT DOCUMENTS

| | | |
|---|---|---|
| CN | 201711387153.6 | 5/2018 |
| CN | 202110024288.6 | 10/2021 |

* cited by examiner

*Primary Examiner* — Ahmed A Berhan

(57) ABSTRACT

The present application discloses an image processing device and method, and relates to the technical field of color calibration. The device of the present application includes: an acquisition unit, configured to acquire an image to be displayed, the image to be displayed containing a plurality of pixel points; a first determination unit, configured to determine a converted RGB value corresponding to each of the pixel points according to an original RGB value corresponding to each of the pixel points; a second determination unit, configured to determine a calibration RGB difference value corresponding to each of the pixel points according to the converted RGB value corresponding to each of the pixel points and a target look-up table; a third determination unit, configured to determine a calibration RGB value corresponding to each of the pixel points according to the converted RGB value and the calibration RGB difference value corresponding to each of the pixel points; and an output unit, configured to output and display the image to be displayed according to the calibration RGB value corresponding to each of the pixel points.

15 Claims, 2 Drawing Sheets

IMAGE PROCESSING DEVICE AND METHOD

CROSS-REFERENCE TO RELATED APPLICATION

This application claims priority to Chinese Patent Application No. CN202210944237X, titled "DEVICE, METHOD AND PROGRAM FOR PROCESSING IMAGE" and filed to the State Patent Intellectual Property Office on the entire contents of which are incorporated herein by reference.

TECHNICAL FIELD

The present application relates to the technical field of color calibration, and in particular to an image processing device and method.

BACKGROUND ART

In order to ensure that a display apparatus outputs and displays a truer color, the display apparatus needs to perform color calibration processing on an image to be output.

At present, the display apparatus usually performs color calibration processing on an image to be displayed through an IP module in a TCON chip. In a specific process, the TCON chip reads a look-up table (LUT) stored in an RAM, and writes the look-up table into an SRAM of the IP module. After obtaining an image to be displayed, according to an original RGB value corresponding to each pixel point contained in the image to be displayed, the IP module looks up the look-up table for a calibration RGB value corresponding to each pixel point, and then controls the display apparatus to output and display the image to be displayed according to the calibration RGB value corresponding to each pixel point. A plurality of sampling RGB values and a calibration RGB value corresponding to each sampling RGB value are recorded in the look-up table.

However, a data volume corresponding to each calibration RGB value recorded in the look-up table is related to a color bit depth corresponding to the display apparatus. For example, the color bit depth corresponding to the display apparatus is 12 bit. Then the data volume corresponding to each calibration RGB value is 12 bit, thus resulting in a larger data volume of the look-up table. Therefore, it is required that the TCON chip has a large-capacity RAM to store the look-up table and the IP module has a large-capacity SRAM to store the look-up table, thus resulting in a high manufacturing cost of the TCON chip.

SUMMARY OF THE INVENTION

Examples of the present application provide an image processing device and method, and mainly aim to reduce the data volume of a look-up table, thereby reducing the manufacturing cost of a TCON chip.

In order to solve the above-mentioned technical problem, the examples of the present application provide the following technical solutions:

According to a first aspect, the present application provides an image processing device applied to a target TCON chip. The device includes:
an acquisition unit, configured to acquire an image to be displayed, the image to be displayed containing a plurality of pixel points;
a first determination unit, configured to determine a converted RGB value corresponding to each of the pixel points according to an original RGB value corresponding to each of the pixel points;
a second determination unit, configured to determine a calibration RGB difference value corresponding to each of the pixel points according to the converted RGB value corresponding to each of the pixel points and a target look-up table;
a third determination unit, configured to determine a calibration RGB value corresponding to each of the pixel points according to the converted RGB value and the calibration RGB difference value corresponding to each of the pixel points; and
an output unit, configured to output and display the image to be displayed according to the calibration RGB value corresponding to each of the pixel points.

Alternatively, the first determination unit includes:
a first determination module, configured to determine whether color depth conversion processing is required or not according to a color bit depth corresponding to the image to be displayed and a color bit depth corresponding to a target display apparatus, the target display apparatus being a display apparatus where the target TCON chip is located;
a calculation module, configured to calculate the converted RGB value corresponding to each of the pixel points according to a preset algorithm, the color bit depth corresponding to the image to be displayed, the color bit depth corresponding to the target display apparatus, and the original RGB value corresponding to each of the pixel points when the first determination module determines that color depth conversion processing is required; and
a second determination module, configured to determine the original RGB value corresponding to each of the pixel points as the converted RGB value corresponding to each of the pixel points when the first determination module determines that color depth conversion processing is not required.

Alternatively, a plurality of sampling RGB values and a calibration RGB difference value corresponding to each of the sampling RGB values are specifically recorded in the target look-up table.

The second determination unit is specifically configured to: determine whether a target sampling RGB value corresponding to the pixel point exists or not in the target look-up table according to the converted RGB value corresponding to the pixel point;
look up the target look-up table for a calibration RGB difference value corresponding to the target sampling RGB value if the target sampling RGB value corresponding to the pixel point exists; and
determine the calibration RGB difference value corresponding to the target sampling RGB value as a calibration RGB difference value corresponding to the pixel point.

Alternatively, the second determination unit is also specifically configured to: look up the target look-up table for a calibration RGB difference value corresponding to a first adjacent sampling RGB value and a calibration RGB difference value corresponding to a second adjacent sampling RGB value if the target sampling RGB value corresponding to the pixel point does not exist, the first adjacent sampling RGB value being a sampling RGB value, smaller than but closest to the converted RGB value corresponding to the pixel point, among the plurality of sampling RGB values, and the second adjacent sampling RGB value being a sampling RGB value, greater than but closest to the converted RGB value corresponding to the pixel point, among the plurality of sampling RGB values; and determine the calibration RGB difference value corresponding to the first adjacent sampling RGB value and the calibration RGB difference value corresponding to the second adjacent sampling RGB value as the calibration RGB difference value corresponding to the pixel point.

Alternatively, the third determination unit is specifically configured to: calculate a calibration RGB value corresponding to the pixel point according to the converted RGB value corresponding to the pixel point and the calibration RGB difference value corresponding to the target sampling RGB value when the calibration RGB difference value corresponding to the pixel point is specifically the calibration RGB difference value corresponding to the target sampling RGB value. Alternatively, the third determination unit is also specifically configured to: calculate a calibration RGB value corresponding to the first adjacent sampling RGB value according to the first adjacent sampling RGB value and the calibration RGB difference value corresponding to the first adjacent sampling RGB value when the calibration RGB difference value corresponding to the pixel point is specifically the calibration RGB difference value corresponding to the first adjacent sampling RGB value and the calibration RGB difference value corresponding to the second adjacent sampling RGB value;

calculate a calibration RGB value corresponding to the second adjacent sampling RGB value according to the second adjacent sampling RGB value and the calibration RGB difference value corresponding to the second adjacent sampling RGB value; and calculate a calibration RGB value corresponding to the pixel point according to the preset algorithm, the converted RGB value corresponding to the pixel point, the first adjacent sampling RGB value, the calibration RGB value corresponding to the first adjacent sampling RGB value, the second adjacent sampling RGB value, and the calibration RGB value corresponding to the second adjacent sampling RGB value.

Alternatively, a plurality of sampling gray scale values contained in each color channel and a calibration gray scale difference value corresponding to each of the sampling gray scale values are specifically recorded in the target look-up table.

The second determination unit is specifically configured to: determine a converted gray scale value corresponding to each color channel of the pixel point according to the converted RGB value corresponding to the pixel point;

determine a calibration gray scale difference value corresponding to each color channel according to the converted gray scale value corresponding to each color channel of the pixel point and the target look-up table; and determine the calibration gray scale difference values corresponding to the plurality of color channels of the pixel point as the calibration RGB difference value corresponding to the pixel point.

Alternatively, the third determination unit is specifically configured to: calculate a calibration gray scale value corresponding to each color channel of the pixel point according to the converted gray scale value and the calibration gray scale difference value corresponding to each color channel of the pixel point; and determine the calibration gray scale values corresponding to the plurality of color channels of the pixel point as the calibration RGB value corresponding to the pixel point.

Alternatively, a plurality of sampling gray scale values contained in each color channel and a high calibration gray scale difference value and a low calibration gray scale difference value corresponding to each of the sampling gray scale values are specifically recorded in the target look-up table.

The second determination unit is specifically configured to: determine a converted gray scale value corresponding to each color channel of the pixel point according to the converted RGB value corresponding to the pixel point;

determine a high calibration gray scale difference value and a low calibration gray scale difference value corresponding to each color channel according to the converted gray scale value corresponding to each color channel of the pixel point and the target look-up table; and determine the high calibration gray scale difference values and the low calibration gray scale difference values corresponding to the plurality of color channels of the pixel point as the calibration RGB difference value corresponding to the pixel point.

Alternatively, the third determination unit is specifically configured to: calculate a high calibration gray scale value and a low calibration gray scale value corresponding to each color channel of the pixel point according to the converted gray scale value, the high calibration gray scale difference value and the low calibration gray scale difference value corresponding to each color channel of the pixel point;

calculate a calibration gray scale value corresponding to each color channel of the pixel point according to the high calibration gray scale value and the low calibration gray scale value corresponding to each color channel of the pixel point; and determine the calibration gray scale values corresponding to the plurality of color channels of the pixel point as the calibration RGB value corresponding to the pixel point.

According to a second aspect, the present application also provides an image processing method applied to a target TCON chip. The method includes:

acquiring an image to be displayed, the image to be displayed containing a plurality of pixel points;

determining a converted RGB value corresponding to each of the pixel points according to an original RGB value corresponding to each of the pixel points;

determining a calibration RGB difference value corresponding to each of the pixel points according to the converted RGB value corresponding to each of the pixel points and a target look-up table;

determining a calibration RGB value corresponding to each of the pixel points according to the converted RGB value and the calibration RGB difference value corresponding to each of the pixel points; and outputting and displaying the image to be displayed according to the calibration RGB value corresponding to each of the pixel points.

Alternatively, the determining a converted RGB value corresponding to each of the pixel points according to an original RGB value corresponding to each of the pixel points includes:

determining whether color depth conversion processing is required or not according to a color bit depth corresponding to the image to be displayed and a color bit depth corresponding to a target display apparatus, the target display apparatus being a display apparatus where the target TCON chip is located;

if so, calculating the converted RGB value corresponding to each of the pixel points according to a preset algorithm, the color bit depth corresponding to the image to be displayed, the color bit depth corresponding to the target display apparatus, and the original RGB value corresponding to each of the pixel points; and if not, determining the converted RGB value corresponding to each of the pixel points according to the original RGB value corresponding to each of the pixel points.

Alternatively, a plurality of sampling RGB values and a calibration RGB difference value corresponding to each of the sampling RGB values are specifically recorded in the target look-up table. The determining a calibration RGB difference value corresponding to each of the pixel points according to the converted RGB value corresponding to each of the pixel points and a target look-up table includes:

determining whether a target sampling RGB value corresponding to the pixel point exists or not in the target look-up table according to the converted RGB value corresponding to the pixel point;

looking up the target look-up table for a calibration RGB difference value corresponding to the target sampling RGB value if the target sampling RGB value corresponding to the pixel point exists; and determining the calibration RGB difference value corresponding to the target sampling RGB value as a calibration RGB difference value corresponding to the pixel point.

Alternatively, the determining a calibration RGB difference value corresponding to each of the pixel points according to the converted RGB value corresponding to each of the pixel points and a target look-up table also includes:

looking up the target look-up table for a calibration RGB difference value corresponding to a first adjacent sampling RGB value and a calibration RGB difference value corresponding to a second adjacent sampling RGB value if the target sampling RGB value corresponding to the pixel point does not exist, the first adjacent sampling RGB value being a sampling RGB value, smaller than but closest to the converted RGB value corresponding to the pixel point, among the plurality of sampling RGB values, and the second adjacent sampling RGB value being a sampling RGB value, greater than but closest to the converted RGB value corresponding to the pixel point, among the plurality of sampling RGB values; and determining the calibration RGB difference value corresponding to the first adjacent sampling RGB value and the calibration RGB difference value corresponding to the second adjacent sampling RGB value as the calibration RGB difference value corresponding to the pixel point.

Alternatively, the determining a calibration RGB value corresponding to each of the pixel points according to the converted RGB value and the calibration RGB difference value corresponding to each of the pixel points includes:

calculating a calibration RGB value corresponding to the pixel point according to the converted RGB value corresponding to the pixel point and the calibration RGB difference value corresponding to the target sampling RGB value when the calibration RGB difference value corresponding to the pixel point is specifically the calibration RGB difference value corresponding to the target sampling RGB value.

Alternatively, the determining a calibration RGB value corresponding to each of the pixel points according to the converted RGB value and the calibration RGB difference value corresponding to each of the pixel points includes:

calculating a calibration RGB value corresponding to the first adjacent sampling RGB value according to the first adjacent sampling RGB value and the calibration RGB difference value corresponding to the first adjacent sampling RGB value when the calibration RGB difference value corresponding to the pixel point is specifically the calibration RGB difference value corresponding to the first adjacent sampling RGB value and the calibration RGB difference value corresponding to the second adjacent sampling RGB value;

calculating a calibration RGB value corresponding to the second adjacent sampling RGB value according to the second adjacent sampling RGB value and the calibration RGB difference value corresponding to the second adjacent sampling RGB value; and calculating a calibration RGB value corresponding to the pixel point according to the preset algorithm, the converted RGB value corresponding to the pixel point, the first adjacent sampling RGB value, the calibration RGB value corresponding to the first adjacent sampling RGB value, the second adjacent sampling RGB value, and the calibration RGB value corresponding to the second adjacent sampling RGB value.

Alternatively, a plurality of sampling gray scale values contained in each color channel and a calibration gray scale difference value corresponding to each of the sampling gray scale values are specifically recorded in the target look-up table. The determining a calibration RGB difference value corresponding to each of the pixel points according to the converted RGB value corresponding to each of the pixel points and a target look-up table includes:

determining a converted gray scale value corresponding to each color channel of the pixel point according to the converted RGB value corresponding to the pixel point;

determining a calibration gray scale difference value corresponding to each color channel according to the converted gray scale value corresponding to each color channel of the pixel point and the target look-up table; and determining the calibration gray scale difference values corresponding to the plurality of color channels of the pixel point as the calibration RGB difference value corresponding to the pixel point.

Alternatively, the determining a calibration RGB value corresponding to each of the pixel points according to the converted RGB value and the calibration RGB difference value corresponding to each of the pixel points includes:

calculating a calibration gray scale value corresponding to each color channel of the pixel point according to the converted gray scale value and the calibration gray scale difference value corresponding to each color channel of the pixel point; and determining the calibration gray scale values corresponding to the plurality of color channels of the pixel point as the calibration RGB value corresponding to the pixel point.

Alternatively, a plurality of sampling gray scale values contained in each color channel and a high calibration gray scale difference value and a low calibration gray scale difference value corresponding to each of the sampling gray scale values are specifically recorded in the target look-up table. The determining a calibration RGB difference value corresponding to each of the pixel points according to the converted RGB value corresponding to each of the pixel points and a target look-up table includes:

determining a converted gray scale value corresponding to each color channel of the pixel point according to the converted RGB value corresponding to the pixel point;

determining a high calibration gray scale difference value and a low calibration gray scale difference value corresponding to each color channel according to the converted gray scale value corresponding to each color channel of the pixel point and the target look-up table; and determining the high calibration gray scale difference values and the low calibration gray scale difference values corresponding to the plurality of color channels of the pixel point as the calibration RGB difference value corresponding to the pixel point.

Alternatively, the determining a calibration RGB value corresponding to each of the pixel points according to the converted RGB value and the calibration RGB difference value corresponding to each of the pixel points includes:

calculating a high calibration gray scale value and a low calibration gray scale value corresponding to each color channel of the pixel point according to the converted gray scale value, the high calibration gray scale difference value and the low calibration gray scale difference value corresponding to each color channel of the pixel point;

calculating a calibration gray scale value corresponding to each color channel of the pixel point according to the high calibration gray scale value and the low calibration gray scale value corresponding to each color channel of the pixel point; and determining the calibration gray scale values corresponding to the plurality of color channels of the pixel point as the calibration RGB value corresponding to the pixel point.

According to a third aspect, an example of the present application provides a timing control device, including: the image processing device as described in the first aspect.

According to a fourth aspect, an example of the present application provides a display device, including: the timing control device as described in the third aspect.

According to a fifth aspect, an example of the present application provides a storage medium, including a stored program. The program, when executed, controls an apparatus where the storage medium is located to perform the image processing method as described in the second aspect.

According to a sixth aspect, an example of the present application provides an image processing device, including a storage medium and one or more processors. The storage medium is coupled to the processor, the processor is configured to execute a program instruction stored in the storage medium, and the program instruction, when executed, performs the image processing method as described in the second aspect.

By means of the above-mentioned technical solutions, the technical solutions provided by the present application have at least the following advantages:

The present application provides an image processing device and method. The image processing device provided in the present application includes: an acquisition unit, a first determination unit, a second determination unit, a third determination unit, and an output unit. Firstly, the acquisition unit acquires an image to be displayed. Secondly, the first determination unit determines a converted RGB value corresponding to each pixel point according to an original RGB value corresponding to each pixel point contained in the image to be displayed. Again, the second determination unit determines a calibration RGB difference value corresponding to each pixel point according to the converted RGB value corresponding to each pixel point and a target look-up table. Then, the third determination unit determines a calibration RGB value corresponding to each pixel point according to the converted RGB value and the calibration RGB difference value corresponding to each pixel point. Finally, the output unit outputs and displays the image to be displayed according to the calibration RGB value corresponding to each pixel point. In the present application, it is not necessary to record a plurality of sampling RGB values and a calibration RGB value corresponding to each sampling RGB value in the target look-up table, but to record a plurality of sampling RGB values and a calibration RGB difference value corresponding to each sampling RGB value, or to record a plurality of sampling gray scale values contained in each color channel and a calibration gray scale difference value corresponding to each sampling gray scale value, or to record a plurality of sampling gray scale values contained in each color channel and a calibration gray scale difference value and a low calibration gray scale difference value corresponding to each sampling gray scale value. A data volume corresponding to any one calibration RGB difference value is related to a specific value of the calibration RGB difference value, a data volume corresponding to any one calibration gray scale difference value is related to the calibration gray scale difference value, a data volume corresponding to any one high calibration gray scale difference value is related to the high calibration gray scale difference value, and a data volume corresponding to any one low calibration gray scale difference value is related to the low calibration gray scale difference value. Therefore, the data volume of the target look-up table can be effectively reduced, whereby the target TCON chip can use a small-capacity RAM to store the target look-up table. Furthermore, the manufacturing cost of the target TCON chip can be effectively reduced.

The above description is merely a summary of the technical solutions of the present application. In order to more clearly know the technical means of the present application to implement according to the contents of the description, and in order to make the above-mentioned and other objects, features and advantages of the present application more apparent and understandable, specific embodiments of the present application are provided below.

BRIEF DESCRIPTION OF THE DRAWINGS

The above-mentioned and other objects, features and advantages of exemplary embodiments of the present application will become readily understandable from the following detailed description when read with reference to the accompanying drawings. Several embodiments of the present application are illustrated by way of example, and not by way of limitation, in the accompanying drawings, and the same or corresponding reference numerals denote the same or corresponding parts, in the drawings.

DETAILED DESCRIPTION OF THE INVENTION

Exemplary embodiments of the present application will be described in more detail below with reference to the accompanying drawings. While the drawings show exemplary embodiments of the present application, it should be understood that the present application may be embodied in various forms and should not be limited by the embodiments set forth herein. Rather, these embodiments are provided so that the present application will be thoroughly understood, and the scope of the present application will be fully conveyed to those skilled in the art.

It should be noted that unless otherwise indicated, technical or scientific terms used herein should have the ordinary meaning as understood by those skilled in the art to which the present application belongs.

Figure 1:
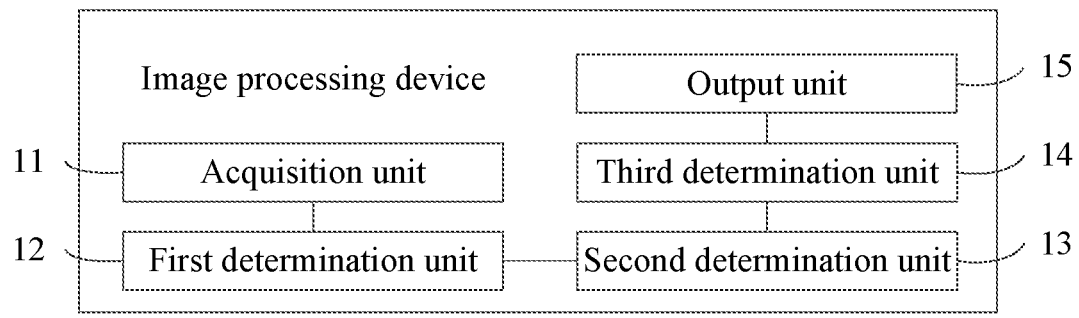
FIG. 1 shows a constitutional block diagram of an image processing device according to an example of the present application.

An example of the present application provides an image processing device which may be specifically applied to a target IP module in a target TCON chip. The target IP module is specifically: a Gamma module or a VAC module. The target TCON chip is specifically: a TCON chip in a target display apparatus which may be but is not limited to: a display, a television screen, etc. As shown in FIG. 1, the device includes: an acquisition unit 11, configured to acquire an image to be displayed, the image to be displayed contains a plurality of pixel points; a first determination unit 12, configured to determine a converted RGB value corresponding to each pixel point according to an original RGB value corresponding to each pixel point; a second determination unit 13, configured to determine a calibration RGB difference value corresponding to each pixel point according to the converted RGB value corresponding to each pixel point and a target look-up table; a third determination unit 14, configured to determine a calibration RGB value corresponding to each pixel point according to the converted RGB value and the calibration RGB difference value corresponding to each pixel point; and an output unit 15, configured to output and display the image to be displayed according to the calibration RGB value corresponding to each pixel point.

A detailed process of the image processing device performing color calibration processing on an image to be displayed will be described in detail with reference to the image processing device shown in FIG. 1.

The target look-up table records a plurality of sampling RGB values and a calibration RGB difference value corresponding to each sampling RGB value, or records a plurality of sampling gray scale values contained in each color channel and a calibration gray scale difference value corresponding to each sampling gray scale value, or records a plurality of sampling gray scale values contained in each color channel and a high calibration gray scale difference value and a low calibration gray scale difference value corresponding to each sampling gray scale value. For any one sampling RGB value, the calibration RGB difference value corresponding to the sampling RGB value is a difference value between the sampling RGB value and the calibration RGB value corresponding to the sampling RGB value. A data volume corresponding to any one calibration RGB difference value is related to a specific value of the calibration RGB difference value. For example, a value range corresponding to a signed number of 4 bit is [−8, 7]. Therefore, when a calibration RGB difference value corresponding to a certain sampling RGB value is 6, the calibration RGB difference value may be represented by a signed number of 4 bit. That is, the data volume corresponding to the calibration RGB difference value is 4 bit, and the value range corresponding to a signed number of 6 bit is [−32, 31]. Therefore, when a calibration RGB difference value corresponding to a certain sampling RGB value is −19, the calibration RGB difference value may be represented by a signed number of 6 bit. That is, the data volume corresponding to the calibration RGB difference value is 6 bit. For any one sampling gray scale value contained in any one color channel, a calibration gray scale difference value corresponding to the sampling gray scale value is a difference value between the sampling gray scale value and the calibration gray scale value corresponding to the sampling gray scale value, and the data volume corresponding to any one calibration gray scale difference value is related to the calibration gray scale difference value. For example, when a calibration gray scale difference value corresponding to a certain sampling gray scale value is −5, the calibration gray scale difference value may be represented by a signed number of 4 bit. That is, the data volume corresponding to the calibration gray scale difference value is 4 bit. For any one sampling gray scale value contained in any one color channel, a high calibration gray scale difference value corresponding to the sampling gray scale value is a difference value between the sampling gray scale value and a high calibration gray scale value corresponding to the sampling gray scale value, a low calibration gray scale difference value corresponding to the sampling gray scale value is a difference value between the sampling gray scale value and a low calibration gray scale value corresponding to the sampling gray scale value, the data volume corresponding to any one high calibration gray scale difference value is related to the high calibration gray scale difference value, and the data volume corresponding to any one low calibration gray scale difference value is related to the low calibration gray scale difference value. For example, when a high calibration gray scale difference value corresponding to a certain sampling gray scale value is 20, the high calibration gray scale difference value may be represented by a signed number of 6 bit. That is, the data volume corresponding to the high calibration gray scale difference value is 6 bit. When a low calibration gray scale difference value corresponding to a certain sampling gray scale value is 5, the high calibration gray scale difference value may be represented by a signed number of 4 bit. That is, the data volume corresponding to the high calibration gray scale difference value is 4 bit.

In the example of the present application, when desiring the target display apparatus to output and display an image to be displayed, a user may input a corresponding instruction to a target terminal apparatus containing the target display apparatus. After receiving the instruction input by the user, the target terminal apparatus sends the image to be displayed to the target IP module in the target TCON chip. At this moment, the acquisition unit 11 in the target IP module may obtain the image to be displayed. The plurality of sampling RGB values (or the plurality of sampling gray scale values contained in each color channel) recorded in the target look-up table are determined according to a color bit depth of the target display apparatus. Therefore, after the acquisition unit 11 obtains the image to be displayed, the first determination unit 12 needs to perform color depth conversion processing on the image to be displayed, i.e. determines a converted RGB value corresponding to each pixel point according to an original RGB value corresponding to each pixel point contained in the image to be displayed. After the first determination unit 12 determines the converted RGB value corresponding to each pixel point according to the original RGB value corresponding to each pixel point, the second determination unit 13 may determine a calibration RGB difference value corresponding to each pixel point according to the converted RGB value corresponding to each pixel point and a target look-up table. After the second determination unit 13 determines the calibration RGB difference value corresponding to each pixel point according to the converted RGB value corresponding to each pixel point and the target look-up table, the third determination unit 14 may determine a calibration RGB value corresponding to each pixel point according to the converted RGB value and the calibration RGB difference value corresponding to each pixel point. After the third determination unit 14 determines the calibration RGB value corresponding to each pixel point according to the converted RGB value and the calibration RGB difference value corresponding to each pixel point, the output unit 15 may output and display the image to be displayed according to the calibration RGB value corresponding to each pixel point, i.e. control the target display apparatus to output and display the image to be displayed according to the calibration RGB value corresponding to each pixel point, thereby completing the color calibration processing of the image to be displayed.

An example of the present application provides an image processing device. The image processing device provided in the example of the present application includes: an acquisition unit, a first determination unit, a second determination unit, a third determination unit, and an output unit. Firstly, the acquisition unit acquires an image to be displayed. Secondly, the first determination unit determines a converted RGB value corresponding to each pixel point according to an original RGB value corresponding to each pixel point contained in the image to be displayed. Again, the second determination unit determines a calibration RGB difference value corresponding to each pixel point according to the converted RGB value corresponding to each pixel point and a target look-up table. Then, the third determination unit determines a calibration RGB value corresponding to each pixel point according to the converted RGB value and the calibration RGB difference value corresponding to each pixel point. Finally, the output unit outputs and displays the image to be displayed according to the calibration RGB value corresponding to each pixel point. In the example of the present application, it is not necessary to record a plurality of sampling RGB values and a calibration RGB value corresponding to each sampling RGB value in the target look-up table, but to record a plurality of sampling RGB values and a calibration RGB difference value corresponding to each sampling RGB value, or to record a plurality of sampling gray scale values contained in each color channel and a calibration gray scale difference value corresponding to each sampling gray scale value, or to record a plurality of sampling gray scale values contained in each color channel and a calibration gray scale difference value and a low calibration gray scale difference value corresponding to each sampling gray scale value. A data volume corresponding to any one calibration RGB difference value is related to a specific value of the calibration RGB difference value, a data volume corresponding to any one calibration gray scale difference value is related to the calibration gray scale difference value, a data volume corresponding to any one high calibration gray scale difference value is related to the high calibration gray scale difference value, and a data volume corresponding to any one low calibration gray scale difference value is related to the low calibration gray scale difference value. Therefore, the data volume of the target look-up table can be effectively reduced, whereby the target TCON chip can use a small-capacity RAM to store the target look-up table. Furthermore, the manufacturing cost of the target TCON chip can be effectively reduced.

Figure 2:
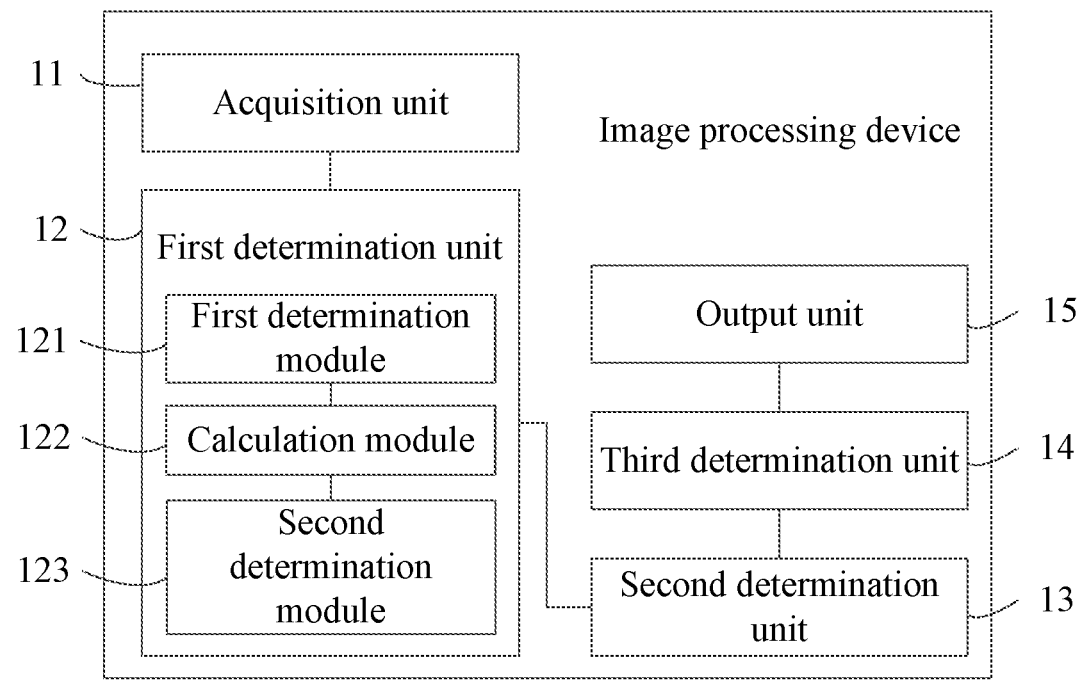
FIG. 2 shows a constitutional block diagram of another image processing device according to an example of the present application.

In order to explain in more detail below, an example of the present application provides another image processing method. Specifically as shown in FIG. 2, the method is applied to an IP module in a target TCON chip. The method includes:

An example of the present application also provides another image processing device which is specifically applied to a target IP module in a target TCON chip. The target IP module is specifically: a Gamma module or a VAC module. As shown in FIG. 2, the following is explained in conjunction with FIG. 2:

Further, as shown in FIG. 2, the first determination unit 12 includes: a first determination module 121, configured to determine whether color depth conversion processing is required or not according to a color bit depth corresponding to the image to be displayed and a color bit depth corresponding to a target display apparatus, the target display apparatus being a display apparatus where the target TCON chip is located; a calculation module 122, configured to calculate the converted RGB value corresponding to each pixel point according to a preset algorithm, the color bit depth corresponding to the image to be displayed, the color bit depth corresponding to the target display apparatus, and the original RGB value corresponding to each pixel point when the first determination module 121 determines that color depth conversion processing is required; and a second determination module 123, configured to determine the original RGB value corresponding to each pixel point as the converted RGB value corresponding to each pixel point when the first determination module 121 determines that color depth conversion processing is not required.

In the example of the present application, the specific process of determining, by the first determination unit 12, a converted RGB value corresponding to each pixel point according to an original RGB value corresponding to each pixel point is as follows:

(1) Firstly, the first determination module 121 determines whether color depth conversion processing is required or not according to a color bit depth corresponding to the image to be displayed and a color bit depth corresponding to a target display apparatus, i.e. determines whether the color bit depth corresponding to the image to be displayed and the color bit depth corresponding to the target display apparatus are the same or not. If the color bit depth corresponding to the image to be displayed and the color bit depth corresponding to the target display apparatus are different, it is determined that color depth conversion processing is required. If the color bit depth corresponding to the image to be displayed and the color bit depth corresponding to the target display apparatus are the same, it is determined that color depth conversion processing is not required. The target display apparatus is a display apparatus where the target TCON chip is located.

(2a) If the first determination module 121 determines that color depth conversion processing is required, the calculation module 122 calculates the converted RGB value corresponding to each pixel point according to the preset algorithm, the color bit depth corresponding to the image to be displayed, the color bit depth corresponding to the target display apparatus, and the original RGB value corresponding to each pixel point. The preset algorithm is specifically a linear interpolation method. The specific process is: firstly, determining a gray scale range corresponding to each color channel of the image to be displayed according to the color bit depth corresponding to the image to be displayed, determining a maximum gray scale value and a minimum gray scale value corresponding to each color channel of the image to be displayed according to the gray scale range corresponding to each color channel of the image to be displayed, then determining a gray scale range corresponding to each color channel of the target display apparatus according to the color bit depth corresponding to the target display apparatus, and determining a maximum gray scale value and a minimum gray scale value corresponding to each color channel of the target display apparatus according to the gray scale range corresponding to each color channel of the target display apparatus. For example, when the color bit depth corresponding to the image to be displayed is 10 bit, the gray scale range corresponding to each color channel of the image to be displayed is [0, 1023]. That is, the maximum gray scale value corresponding to each color channel of the image to be displayed is 1023, and the minimum gray scale value is 0. When the color bit depth corresponding to the target display apparatus is 12 bit, the gray scale range corresponding to each color channel of the target display apparatus is [0, 4095]. That is, the maximum gray scale value corresponding to each color channel of the target display apparatus is 4095, and the minimum gray scale value is 0.

For any one pixel point, an original gray scale value corresponding to each color channel of the pixel point is firstly determined according to the original RGB value corresponding to the pixel point. That is, an original gray scale value corresponding to a red color channel (i.e. an original R value corresponding to the pixel point), an original gray scale value corresponding to a green color channel (i.e. an original G value corresponding to the pixel point) and an original gray scale value corresponding to a blue color channel (i.e. an original B value corresponding to the pixel point) of the pixel point are determined according to the original RGB value corresponding to the pixel point. Then the original R value corresponding to the pixel point, the maximum gray scale value and the minimum gray scale value corresponding to each color channel of the image to be displayed, and the maximum gray scale value and the minimum gray scale value corresponding to each color channel of the target display apparatus are substituted into a preset linear interpolation formula so as to calculate a converted R value corresponding to the pixel point. The original G value corresponding to the pixel point, the maximum gray scale value and the minimum gray scale value corresponding to each color channel of the image to be displayed, and the maximum gray scale value and the minimum gray scale value corresponding to each color channel of the target display apparatus are substituted into the preset linear interpolation formula so as to calculate a converted G value corresponding to the pixel point. The original B value corresponding to the pixel point, the maximum gray scale value and the minimum gray scale value corresponding to each color channel of the image to be displayed, and the maximum gray scale value and the minimum gray scale value corresponding to each color channel of the target display apparatus are substituted into the preset linear interpolation formula so as to calculate a converted B value corresponding to the pixel point. Finally, the converted RGB value corresponding to the pixel point is determined according to the converted R value, the converted G value and the converted B value corresponding to the pixel point. The preset linear interpolation formula is specifically as follows:

$$\frac{y - y_0}{y_1 - y_0} = \frac{x - x_0}{x_1 - x_0}$$

where y is a converted gray scale value corresponding to a certain color channel of the pixel point, x is an original gray scale value corresponding to a certain color channel of the pixel point, $y_1$ is a maximum gray scale value corresponding to each color channel of the target display apparatus, $x_1$ is a maximum gray scale value corresponding to each color channel of the image to be displayed, $y_0$ is a minimum gray scale value corresponding to each color channel of the target display apparatus, and $x_0$ is a minimum gray scale value corresponding to each color channel of the image to be displayed.

(2b) If the first determination module 121 determines that color depth conversion processing is not required, the second determination module 123 determines the original RGB value corresponding to each pixel point as the converted RGB value corresponding to each pixel point.

Further, as shown in FIG. 2, when the target IP module is specifically a Gamma module or a VAC module and a plurality of sampling RGB values and a calibration RGB difference value corresponding to each sampling RGB value are specifically recorded in the target look-up table, the specific process of determining, by the second determination unit 13, a calibration RGB difference value corresponding to each pixel point according to the converted RGB value corresponding to each pixel point and a target look-up table is as follows:

For any one pixel point, it is firstly determined, according to the converted RGB value corresponding to the pixel point, whether a target sampling RGB value corresponding to the pixel point exists in the target look-up table or not. That is, the target look-up table is looked up to determine whether a sampling RGB value with the same value as the converted RGB value corresponding to the pixel point exists or not.

If the target sampling RGB value corresponding to the pixel point exists, the target look-up table is looked up for a calibration RGB difference value corresponding to the target sampling RGB value, and the calibration RGB difference value corresponding to the target sampling RGB value is determined as a calibration RGB difference value corresponding to the pixel point.

If the target sampling RGB value corresponding to the pixel point does not exist, the target look-up table is looked up for a calibration RGB difference value corresponding to a first adjacent sampling RGB value and a calibration RGB difference value corresponding to a second adjacent sampling RGB value, and the calibration RGB difference value corresponding to the first adjacent sampling RGB value and the calibration RGB difference value corresponding to the second adjacent sampling RGB value are determined as the calibration RGB difference value corresponding to the pixel point. The first adjacent sampling RGB value is a sampling RGB value, smaller than but closest to the converted RGB value corresponding to the pixel point, among the plurality of sampling RGB values recorded in the target look-up table, and the second adjacent sampling RGB value is a sampling RGB value, greater than but closest to the converted RGB value corresponding to the pixel point, among the plurality of sampling RGB values recorded in the target look-up table.

Further, as shown in FIG. 2, when the target IP module is specifically a Gamma module or a VAC module and a plurality of sampling gray scale values contained in each color channel and a calibration gray scale difference value corresponding to each sampling gray scale value are specifically recorded in the target look-up table, the specific process of determining, by the second determination unit 13, a calibration RGB difference value corresponding to each pixel point according to the converted RGB value corresponding to each pixel point and a target look-up table is as follows:

For any one pixel point, a converted gray scale value corresponding to each color channel of the pixel point is firstly determined according to a converted RGB value corresponding to the pixel point. That is, a converted gray scale value corresponding to a red color channel of the pixel point (i.e. a converted R value corresponding to the pixel point), a converted gray scale value corresponding to a green color channel (i.e. a converted G value corresponding to the pixel point) and a converted gray scale value corresponding to a blue color channel (i.e. a converted B value corresponding to the pixel point) are determined according to the converted RGB value corresponding to the pixel point.

Then a calibration gray scale difference value corresponding to each color channel of the pixel point is determined according to the converted gray scale value corresponding to each color channel of the pixel point and the target look-up table: it is firstly determined, according to the converted gray scale value corresponding to each color channel of the pixel point, whether a target sampling gray scale value corresponding to each color channel of the pixel point exists or not in the target look-up table, i.e. it is determined whether a sampling gray scale value identical to the value of the converted gray scale value corresponding to the red channel of the pixel point exists or not in the plurality of sampling gray scale values contained in the red channel recorded in the target look-up table, and if so, the found sampling gray scale value is determined as a target sampling gray scale value corresponding to the red channel of the pixel point; it is determined whether a sampling gray scale value identical to the value of the converted gray scale value corresponding to the green channel of the pixel point exists or not in the plurality of sampling gray scale values contained in the green channel recorded in the target look-up table, and if so, the found sampling gray scale value is determined as a target sampling gray scale value corresponding to the green channel of the pixel point; and it is determined whether a sampling gray scale value identical to the value of the converted gray scale value corresponding to the blue channel of the pixel point exists or not in the plurality of sampling gray scale values contained in the blue channel recorded in the target look-up table, and if so, the found sampling gray scale value is determined as a target sampling gray scale value corresponding to the blue channel of the pixel point.

For any one color channel of the pixel point, if the target sampling gray scale value corresponding to the color channel exists, the target look-up table is looked up for a calibration gray scale difference value corresponding to the target sampling gray scale value, and the calibration gray scale difference value corresponding to the target sampling gray scale value is determined as a calibration gray scale difference value corresponding to the color channel. If the target sampling gray scale value corresponding to the color channel does not exist, the target look-up table is looked up for a calibration gray scale difference value corresponding to a first adjacent sampling gray scale value and a calibration gray scale difference value corresponding to a second adjacent sampling gray scale value, and the calibration gray scale difference value corresponding to the first adjacent sampling gray scale value and the calibration gray scale difference value corresponding to the second adjacent sampling gray scale value are determined as the calibration gray scale difference value corresponding to the color channel. The first adjacent sampling gray scale value is a sampling gray scale value, smaller than but closest to a converted gray scale value corresponding to the color channel of the pixel point, among the plurality of sampling gray scale values contained in the color channel recorded in the target look-up table. The second adjacent sampling gray scale value is a sampling gray scale value, greater than but closest to the converted gray scale value corresponding to the color channel of the pixel point, among the plurality of sampling gray scale values contained in the color channel recorded in the target look-up table.

Finally, the calibration gray scale difference values corresponding to the plurality of color channels of the pixel point are determined as a calibration RGB difference value corresponding to the pixel point. That is, the calibration gray scale difference value corresponding to the red channel, the calibration gray scale difference value corresponding to the green channel and the calibration gray scale difference value corresponding to the blue channel of the pixel point are determined as the calibration RGB difference value corresponding to the pixel point.

Further, as shown in FIG. 2, when the target IP module is specifically a VAC module and a plurality of sampling gray scale values contained in each color channel and a high calibration gray scale difference value and a low calibration gray scale difference value corresponding to each sampling gray scale value are specifically recorded in the target look-up table, the specific process of determining, by the second determination unit 13, a calibration RGB difference value corresponding to each pixel point according to the converted RGB value corresponding to each pixel point and a target look-up table is as follows:

For any one pixel point, a converted gray scale value corresponding to each color channel of the pixel point is firstly determined according to a converted RGB value corresponding to the pixel point. That is, a converted gray scale value corresponding to a red color channel of the pixel point (i.e. a converted R value corresponding to the pixel point), a converted gray scale value corresponding to a green color channel (i.e. a converted G value corresponding to the pixel point) and a converted gray scale value corresponding to a blue color channel (i.e. a converted B value corresponding to the pixel point) are determined according to the converted RGB value corresponding to the pixel point.

Then a high calibration gray scale difference value and a low calibration gray scale difference value corresponding to each color channel of the pixel point are determined according to the converted gray scale value corresponding to each color channel of the pixel point and the target look-up table: it is firstly determined, according to the converted gray scale value corresponding to each color channel of the pixel point, whether a target sampling gray scale value corresponding to each color channel of the pixel point exists or not in the target look-up table, i.e. it is determined whether a sampling gray scale value identical to the value of the converted gray scale value corresponding to the red channel of the pixel point exists or not in the plurality of sampling gray scale values contained in the red channel recorded in the target look-up table, and if so, the found sampling gray scale value is determined as a target sampling gray scale value corresponding to the red channel of the pixel point; it is determined whether a sampling gray scale value identical to the value of the converted gray scale value corresponding to the green channel of the pixel point exists or not in the plurality of sampling gray scale values contained in the green channel recorded in the target look-up table, and if so, the found sampling gray scale value is determined as a target sampling gray scale value corresponding to the green channel of the pixel point; and it is determined whether a sampling gray scale value identical to the value of the converted gray scale value corresponding to the blue channel of the pixel point exists or not in the plurality of sampling gray scale values contained in the blue channel recorded in the target look-up table, and if so, the found sampling gray scale value is determined as a target sampling gray scale value corresponding to the blue channel of the pixel point.

For any one color channel of the pixel point, if the target sampling gray scale value corresponding to the color channel exists, the target look-up table is looked up for a high calibration gray scale difference value and a low calibration gray scale difference value corresponding to the target sampling gray scale value, and the high calibration gray scale difference value and the low calibration gray scale difference value corresponding to the target sampling gray scale value are determined as a high calibration gray scale difference value and a low calibration gray scale difference value corresponding to the color channel. If the target sampling gray scale value corresponding to the color channel does not exist, the target look-up table is looked up for a high calibration gray scale difference value and a low calibration gray scale difference value corresponding to a first adjacent sampling gray scale value and a high calibration gray scale difference value and a low calibration gray scale difference value corresponding to a second adjacent sampling gray scale value, and the high calibration gray scale difference value and the low calibration gray scale difference value corresponding to the first adjacent sampling gray scale value and the high calibration gray scale difference value and the low calibration gray scale difference value corresponding to the second adjacent sampling gray scale value are determined as the high calibration gray scale difference value and the low calibration gray scale difference value corresponding to the color channel. The first adjacent sampling gray scale value is a sampling gray scale value, smaller than but closest to a converted gray scale value corresponding to the color channel of the pixel point, among the plurality of sampling gray scale values contained in the color channel recorded in the target look-up table. The second adjacent sampling gray scale value is a sampling gray scale value, greater than but closest to the converted gray scale value corresponding to the color channel of the pixel point, among the plurality of sampling gray scale values contained in the color channel recorded in the target look-up table.

Finally, the high calibration gray scale difference values and the low calibration gray scale difference values corresponding to the plurality of color channels of the pixel point are determined as a calibration RGB difference value corresponding to the pixel point. That is, the high calibration gray scale difference value and the low calibration gray scale difference value corresponding to the red channel, the high calibration gray scale difference value and the low calibration gray scale difference value corresponding to the green channel and the high calibration gray scale difference value and the low calibration gray scale difference value corresponding to the blue channel of the pixel point are determined as the calibration RGB difference value corresponding to the pixel point.

Further, as shown in FIG. 2, when the target IP module is specifically a Gamma module or a VAC module and a plurality of sampling RGB values and a calibration RGB difference value corresponding to each sampling RGB value are specifically recorded in the target look-up table, the specific process of determining, by the third determination unit 14, a calibration RGB value corresponding to each pixel point according to the converted RGB value and the calibration RGB difference value corresponding to each pixel point is as follows:

For any one pixel point, when a calibration RGB difference value corresponding to the pixel point is specifically a calibration RGB difference value corresponding to a target sampling RGB value obtained by look up, a calibration RGB value corresponding to the pixel point is calculated according to a converted RGB value corresponding to the pixel point and the calibration RGB difference value corresponding to the target sampling RGB value. That is, a difference value between the converted RGB value corresponding to the pixel point and the calibration RGB difference value corresponding to the target sampling RGB value is calculated, and a calculation result is determined as the calibration RGB value corresponding to the pixel point.

When the calibration RGB difference value corresponding to the pixel point is specifically a calibration RGB difference value corresponding to a first adjacent sampling RGB value and a calibration RGB difference value corresponding to a second adjacent sampling RGB value obtained by look up, a calibration RGB value corresponding to the first adjacent sampling RGB value is calculated according to the first adjacent sampling RGB value and the calibration RGB difference value corresponding to the first adjacent sampling RGB value (i.e. a difference value between the first adjacent sampling RGB value and the calibration RGB difference value corresponding to the first adjacent sampling RGB value is calculated, and a calculation result is determined as a calibration RGB value corresponding to the first adjacent sampling RGB value), a calibration RGB value corresponding to the second adjacent sampling RGB value is calculated according to the second adjacent sampling RGB value and the calibration RGB difference value corresponding to the second adjacent sampling RGB value (i.e. a difference value between the second adjacent sampling RGB value and the calibration RGB difference value corresponding to the second adjacent sampling RGB value is calculated, and a calculation result is determined as a calibration RGB value corresponding to the second adjacent sampling RGB value), and then a calibration RGB value corresponding to the pixel point is calculated according to a preset algorithm, a converted RGB value corresponding to the pixel point, the first adjacent sampling RGB value, the calibration RGB value corresponding to the first adjacent sampling RGB value, the second adjacent sampling RGB value, and the calibration RGB value corresponding to the second adjacent sampling RGB value. The preset algorithm is specifically a linear interpolation method, i.e. substituting the converted RGB value corresponding to the pixel point, the first adjacent sampling RGB value, the calibration RGB value corresponding to the first adjacent sampling RGB value, the second adjacent sampling RGB value, and the calibration RGB value corresponding to the second adjacent sampling RGB value into a preset linear interpolation formula so as to calculate a calibration RGB value corresponding to the pixel point. The preset linear interpolation formula is specifically as follows:

$$\frac{y - y_0}{y_1 - y_0} = \frac{x - x_0}{x_1 - x_0}$$

where y is a calibration RGB value corresponding to the pixel point, x is a converted RGB value corresponding to the pixel point, $x_0$ is a first adjacent sampling RGB value, $y_0$ is a calibration RGB value corresponding to the first adjacent sampling RGB value, $x_1$ is a second adjacent sampling RGB value, and $y_1$ is a calibration RGB value corresponding to the second adjacent sampling RGB value.

Further, as shown in FIG. 2, when the target IP module is specifically a Gamma module or a VAC module and a plurality of sampling gray scale values contained in each color channel and a calibration gray scale difference value corresponding to each sampling gray scale value are specifically recorded in the target look-up table, the specific process of determining, by the third determination unit 14, a calibration RGB value corresponding to each pixel point according to the converted RGB value and the calibration RGB difference value corresponding to each pixel point is as follows:

For any one pixel point, a calibration gray scale value corresponding to each color channel of the pixel point is calculated according to a converted gray scale value and a calibration gray scale difference value corresponding to each color channel of the pixel point. That is, when a calibration gray scale difference value corresponding to a certain color channel of the pixel point is specifically a calibration gray scale difference value corresponding to a target sampling gray scale value obtained by look up, a calibration gray scale value corresponding to the color channel is calculated according to a converted gray scale value corresponding to the color channel and the calibration gray scale difference value corresponding to the target sampling gray scale value. That is, a difference value between the converted gray scale value corresponding to the color channel and the calibration gray scale difference value corresponding to the target sampling gray scale value is calculated, and a calculation result is determined as the calibration gray scale value corresponding to the color channel.

When the calibration gray scale difference value corresponding to a certain color channel of the pixel point is specifically a calibration gray scale difference value corresponding to a first adjacent sampling gray scale value and a calibration gray scale difference value corresponding to a second adjacent sampling gray scale value obtained by look up, a calibration gray scale value corresponding to the first adjacent sampling gray scale value is calculated according to the first adjacent sampling gray scale value and the calibration gray scale difference value corresponding to the first adjacent sampling gray scale value (i.e. a difference value between the first adjacent sampling gray scale value and the calibration gray scale difference value corresponding to the first adjacent sampling gray scale value is calculated, and a calculation result is determined as a calibration gray scale value corresponding to the first adjacent sampling gray scale value), a calibration gray scale value corresponding to the second adjacent sampling gray scale value is calculated according to the second adjacent sampling gray scale value and the calibration gray scale difference value corresponding to the second adjacent sampling gray scale value (i.e. a difference value between the second adjacent sampling gray scale value and the calibration gray scale difference value corresponding to the second adjacent sampling gray scale value is calculated, and a calculation result is determined as a calibration gray scale value corresponding to the second adjacent sampling gray scale value), and then a calibration gray scale value corresponding to the pixel point is calculated according to a preset algorithm, a converted gray scale value corresponding to the pixel point, the first adjacent sampling gray scale value, the calibration gray scale value corresponding to the first adjacent sampling gray scale value, the second adjacent sampling gray scale value, and the calibration gray scale value corresponding to the second adjacent sampling gray scale value. The preset algorithm is specifically a linear interpolation method, i.e. substituting the converted gray scale value corresponding to the color channel, the first adjacent sampling gray scale value, the calibration gray scale value corresponding to the first adjacent sampling gray scale value, the second adjacent sampling gray scale value, and the calibration gray scale value corresponding to the second adjacent sampling gray scale value into a preset linear interpolation formula so as to calculate a calibration gray scale value corresponding to the color channel. The preset linear interpolation formula is specifically as follows:

$$\frac{y - y_0}{y_1 - y_0} = \frac{x - x_0}{x_1 - x_0}$$

where y is a calibration gray scale value corresponding to the color channel, x is a converted gray scale value corresponding to the color channel, $x_0$ is a first adjacent sampling gray scale value, $y_0$ is a calibration gray scale value corresponding to the first adjacent sampling gray scale value, $x_1$ is a second adjacent sampling gray scale value, and $y_1$ is a calibration gray scale value corresponding to the second adjacent sampling gray scale value.

After determining the calibration gray scale value corresponding to each color channel of the pixel point, the calibration gray scale difference values corresponding to the plurality of color channels of the pixel point are determined as a calibration RGB difference value corresponding to the pixel point. That is, the calibration gray scale difference value corresponding to the red channel, the calibration gray scale difference value corresponding to the green channel and the calibration gray scale difference value corresponding to the blue channel of the pixel point are determined as the calibration RGB difference value corresponding to the pixel point.

Further, as shown in FIG. 2, when the target IP module is specifically a VAC module and a plurality of sampling gray scale values contained in each color channel and a high calibration gray scale difference value and a low calibration gray scale difference value corresponding to each sampling gray scale value are specifically recorded in the target look-up table, the specific process of determining, by the third determination unit 14, a calibration RGB value corresponding to each pixel point according to the converted RGB value and the calibration RGB difference value corresponding to each pixel point is as follows:

For any one pixel point, a high calibration gray scale value and a low calibration gray scale value corresponding to each color channel of the pixel point are firstly calculated according to a converted gray scale value, a high calibration gray scale difference value and a low calibration gray scale difference value corresponding to each color channel of the pixel point. Then, a calibration gray scale value corresponding to each color channel of the pixel point is calculated according to the high calibration gray scale value and the low calibration gray scale value corresponding to each color channel of the pixel point. That is, when a high calibration gray scale difference value and a low calibration gray scale difference value corresponding to a certain color channel of the pixel point are specifically a high calibration gray scale difference value and a low calibration gray scale difference value corresponding to a target sampling gray scale value obtained by look up, a high calibration gray scale value corresponding to the color channel is calculated according to a converted gray scale value corresponding to the color channel and the high calibration gray scale difference value corresponding to the target sampling gray scale value (i.e. a difference value between the converted gray scale value corresponding to the color channel and the high calibration gray scale difference value corresponding to the target sampling gray scale value is calculated, and a calculation result is determined as the high calibration gray scale value corresponding to the color channel), a low calibration gray scale value corresponding to the color channel is calculated according to the converted gray scale value corresponding to the color channel and the low calibration gray scale difference value corresponding to the target sampling gray scale value (i.e. a difference value between the converted gray scale value corresponding to the color channel and the low calibration gray scale difference value corresponding to the target sampling gray scale value is calculated, and a calculation result is determined as the low calibration gray scale value corresponding to the color channel), and a calibration gray scale value corresponding to the color channel is calculated according to the high calibration gray scale value and the low calibration gray scale value corresponding to the color channel.

When the high calibration gray scale difference value and the low calibration gray scale difference value corresponding to a certain color channel of the pixel point are specifically a high calibration gray scale difference value and a low calibration gray scale difference value corresponding to a first adjacent sampling gray scale value and a high calibration gray scale difference value and a low calibration gray scale difference value corresponding to a second adjacent sampling gray scale value obtained by look up, a high calibration gray scale value corresponding to the first adjacent sampling gray scale value is calculated according to the first adjacent sampling gray scale value and the high calibration gray scale difference value corresponding to the first adjacent sampling gray scale value (i.e. a difference value between the first adjacent sampling gray scale value and the high calibration gray scale difference value corresponding to the first adjacent sampling gray scale value is calculated, and a calculation result is determined as a high calibration gray scale value corresponding to the first adjacent sampling gray scale value), a low calibration gray scale value corresponding to the first adjacent sampling gray scale value is calculated according to the first adjacent sampling gray scale value and the low calibration gray scale difference value corresponding to the first adjacent sampling gray scale value (i.e. a difference value between the first adjacent sampling gray scale value and the low calibration gray scale difference value corresponding to the first adjacent sampling gray scale value is calculated, and a calculation result is determined as a low calibration gray scale value corresponding to the first adjacent sampling gray scale value), a high calibration gray scale value corresponding to the second adjacent sampling gray scale value is calculated according to the second adjacent sampling gray scale value and the high calibration gray scale difference value corresponding to the second adjacent sampling gray scale value (i.e. a difference value between the second adjacent sampling gray scale value and the high calibration gray scale difference value corresponding to the second adjacent sampling gray scale value is calculated, and a calculation result is determined as a high calibration gray scale value corresponding to the second adjacent sampling gray scale value), and a low calibration gray scale value corresponding to the second adjacent sampling gray scale value is calculated according to the second adjacent sampling gray scale value and the low calibration gray scale difference value corresponding to the second adjacent sampling gray scale value (i.e. a difference value between the second adjacent sampling gray scale value and the low calibration gray scale difference value corresponding to the second adjacent sampling gray scale value is calculated, and a calculation result is determined as a low calibration gray scale value corresponding to the second adjacent sampling gray scale value). Then a calibration gray scale value corresponding to the first adjacent sampling gray scale value is calculated according to the high calibration gray scale value and the low calibration gray scale value corresponding to the first adjacent sampling gray scale value, and a calibration gray scale value corresponding to the second adjacent sampling gray scale value is calculated according to the high calibration gray scale value and the low calibration gray scale value corresponding to the second adjacent sampling gray scale value. Finally, a calibration gray scale value corresponding to the pixel point is calculated according to a preset algorithm, a converted gray scale value corresponding to the pixel point, the first adjacent sampling gray scale value, the calibration gray scale value corresponding to the first adjacent sampling gray scale value, the second adjacent sampling gray scale value, and the calibration gray scale value corresponding to the second adjacent sampling gray scale value. The preset algorithm is specifically a linear interpolation method, i.e. substituting the converted gray scale value corresponding to the color channel, the first adjacent sampling gray scale value, the calibration gray scale value corresponding to the first adjacent sampling gray scale value, the second adjacent sampling gray scale value, and the calibration gray scale value corresponding to the second adjacent sampling gray scale value into a preset linear interpolation formula so as to calculate a calibration gray scale value corresponding to the color channel. The preset linear interpolation formula is specifically as follows:

$$\frac{y - y_0}{y_1 - y_0} = \frac{x - x_0}{x_1 - x_0}$$

where y is a calibration gray scale value corresponding to the color channel, x is a converted gray scale value corresponding to the color channel, $x_0$ is a first adjacent sampling gray scale value, $y_0$ is a calibration gray scale value corresponding to the first adjacent sampling gray scale value, $x_1$ is a second adjacent sampling gray scale value, and $y_1$ is a calibration gray scale value corresponding to the second adjacent sampling gray scale value.

After determining the calibration gray scale value corresponding to each color channel of the pixel point, the calibration gray scale difference values corresponding to the plurality of color channels of the pixel point are determined as a calibration RGB difference value corresponding to the pixel point. That is, the calibration gray scale difference value corresponding to the red channel, the calibration gray scale difference value corresponding to the green channel and the calibration gray scale difference value corresponding to the blue channel of the pixel point are determined as the calibration RGB difference value corresponding to the pixel point.

It should be noted that any existing calculation method may be adopted in the process of calculating, according to a high calibration gray scale value and a low calibration gray scale value corresponding to a certain color channel, a calibration gray scale value corresponding to the color channel, in the process of calculating, according to a high calibration gray scale value and a low calibration gray scale value corresponding to a certain first adjacent sampling gray scale value, a calibration gray scale value corresponding to the first adjacent sampling gray scale value, and in the process of calculating, according to a high calibration gray scale value and a low calibration gray scale value corresponding to a certain second adjacent sampling gray scale value, a calibration gray scale value corresponding to the second adjacent sampling gray scale value. This is not specifically limited in the examples of the present application.

It should be noted that the modules and units described above maybe implemented by any one of hardware, firmware or software, or a combination thereof. For example, the modules and units can all be implemented by hardware, for example implemented by circuit. Or, in some embodiments, all the modules and units can be implemented by software as program modules or set of instructions. Therefore, the apparatus as a whole may be implemented as programs stored in a non-transitory memory. Or, in some embodiments, according to application scenarios, parts of the modules and units can be implemented by software and parts of the modules and units can be implemented by hardware or firmware. In that case, the apparatus as a whole may be implemented as a device with hardware (circuit) and storage medium.

In order to achieve the above-mentioned object, according to another aspect of the present application, an example of the present application also provides a timing control device, including: the above-mentioned image processing device.

In order to achieve the above-mentioned object, according to another aspect of the present application, an example of the present application also provides a display device, including: the above-mentioned timing control device.

Figure 3:
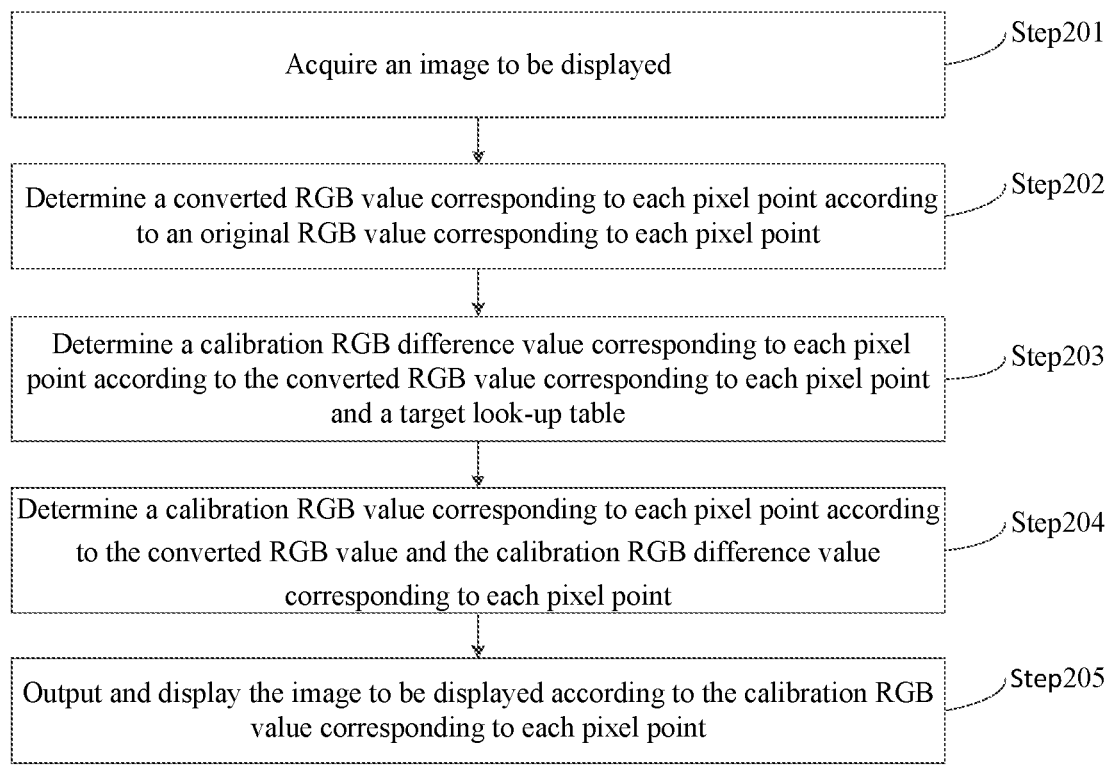
FIG. 3 shows a flowchart of an image processing method according to an example of the present application.

Further, as an implementation of the above-mentioned devices shown in FIGS. 1 and 2, another example of the present application also provides an image processing method. The method may be specifically applied to a target IP module in a target TCON chip. The target IP module is specifically: a Gamma module or a VAC module. The method example corresponds to the foregoing device example. In order to facilitate reading, this method example will not describe the details in the foregoing device example. However, it should be clear that the method in this example can correspondingly implement all the contents in the foregoing device example. The method is applied to reduce the data volume of a look-up table, thereby reducing the manufacturing cost of a TCON chip. Specifically as shown in FIG. 3, the method includes the following steps:

Step 201: Acquire an image to be displayed.

The image to be displayed contains a plurality of pixel points.

Step 202: Determine a converted RGB value corresponding to each pixel point according to an original RGB value corresponding to each pixel point.

Step 203: Determine a calibration RGB difference value corresponding to each pixel point according to the converted RGB value corresponding to each pixel point and a target look-up table.

Step 204: Determine a calibration RGB value corresponding to each pixel point according to the converted RGB value and the calibration RGB difference value corresponding to each pixel point.

Step 205: Output and display the image to be displayed according to the calibration RGB value corresponding to each pixel point.

Further, step 202 of determining a converted RGB value corresponding to each pixel point according to an original RGB value corresponding to each pixel point includes:

determining whether color depth conversion processing is required or not according to a color bit depth corresponding to the image to be displayed and a color bit depth corresponding to a target display apparatus, the target display apparatus being a display apparatus where the target TCON chip is located;

if so, calculating the converted RGB value corresponding to each of the pixel points according to a preset algorithm, the color bit depth corresponding to the image to be displayed, the color bit depth corresponding to the target display apparatus, and the original RGB value corresponding to each of the pixel points; and if not, determining the converted RGB value corresponding to each of the pixel points according to the original RGB value corresponding to each of the pixel points.

Further, the target IP module is specifically a Gamma module or a VAC module, and a plurality of sampling RGB values and a calibration RGB difference value corresponding to each sampling RGB value are specifically recorded in the target look-up table. Step 203 of determining a calibration RGB difference value corresponding to each pixel point according to the converted RGB value corresponding to each pixel point and a target look-up table includes:

determining whether a target sampling RGB value corresponding to the pixel point exists or not in the target look-up table according to the converted RGB value corresponding to the pixel point;

looking up the target look-up table for a calibration RGB difference value corresponding to the target sampling RGB value if the target sampling RGB value corresponding to the pixel point exists, and determining the calibration RGB difference value corresponding to the target sampling RGB value as a calibration RGB difference value corresponding to the pixel point;

looking up the target look-up table for a calibration RGB difference value corresponding to a first adjacent sampling RGB value and a calibration RGB difference value corresponding to a second adjacent sampling RGB value if the target sampling RGB value corresponding to the pixel point does not exist, the first adjacent sampling RGB value being a sampling RGB value, smaller than but closest to the converted RGB value corresponding to the pixel point, among the plurality of sampling RGB values, and the second adjacent sampling RGB value being a sampling RGB value, greater than but closest to the converted RGB value corresponding to the pixel point, among the plurality of sampling RGB values; and determining the calibration RGB difference value corresponding to the first adjacent sampling RGB value and the calibration RGB difference value corresponding to the second adjacent sampling RGB value as the calibration RGB difference value corresponding to the pixel point.

Further, the target IP module is specifically a Gamma module or a VAC module, and a plurality of sampling RGB values and a calibration RGB difference value corresponding to each sampling RGB value are specifically recorded in the target look-up table. Step 204 of determining a calibration RGB value corresponding to each pixel point according to the converted RGB value and the calibration RGB difference value corresponding to each pixel point includes:

calculating a calibration RGB value corresponding to the pixel point according to the converted RGB value corresponding to the pixel point and the calibration RGB difference value corresponding to the target sampling RGB value when the calibration RGB difference value corresponding to the pixel point is specifically the calibration RGB difference value corresponding to the target sampling RGB value;

calculating a calibration RGB value corresponding to the first adjacent sampling RGB value according to the first adjacent sampling RGB value and the calibration RGB difference value corresponding to the first adjacent sampling RGB value when the calibration RGB difference value corresponding to the pixel point is specifically the calibration RGB difference value corresponding to the first adjacent sampling RGB value and the calibration RGB difference value corresponding to the second adjacent sampling RGB value; calculating a calibration RGB value corresponding to the second adjacent sampling RGB value according to the second adjacent sampling RGB value and the calibration RGB difference value corresponding to the second adjacent sampling RGB value; and calculating a calibration RGB value corresponding to the pixel point according to the preset algorithm, the converted RGB value corresponding to the pixel point, the first adjacent sampling RGB value, the calibration RGB value corresponding to the first adjacent sampling RGB value, the second adjacent sampling RGB value, and the calibration RGB value corresponding to the second adjacent sampling RGB value.

Further, the target IP module is specifically a Gamma module or a VAC module, and a plurality of sampling gray scale values contained in each color channel and a calibration gray scale difference value corresponding to each sampling gray scale value are specifically recorded in the target look-up table. Step 203 of determining a calibration RGB difference value corresponding to each pixel point according to the converted RGB value corresponding to each pixel point and a target look-up table includes:

determining a converted gray scale value corresponding to each color channel of the pixel point according to the converted RGB value corresponding to the pixel point;
  determining a calibration gray scale difference value corresponding to each color channel according to the converted gray scale value corresponding to each color channel of the pixel point and the target look-up table; and
  determining the calibration gray scale difference values corresponding to the plurality of color channels of the pixel point as the calibration RGB difference value corresponding to the pixel point.

Further, the target IP module is specifically a Gamma module or a VAC module, and a plurality of sampling gray scale values contained in each color channel and a calibration gray scale difference value corresponding to each sampling gray scale value are specifically recorded in the target look-up table. Step 204 of determining a calibration RGB value corresponding to each pixel point according to the converted RGB value and the calibration RGB difference value corresponding to each pixel point includes:

calculating a calibration gray scale value corresponding to each color channel of the pixel point according to the converted gray scale value and the calibration gray scale difference value corresponding to each color channel of the pixel point; and
  determining the calibration gray scale difference values corresponding to the plurality of color channels of the pixel point as the calibration RGB difference value corresponding to the pixel point.

Further, the target IP module is specifically a VAC module, and a plurality of sampling gray scale values contained in each color channel and a high calibration gray scale difference value and a low calibration gray scale difference value corresponding to each sampling gray scale value are specifically recorded in the target look-up table. Step 203 of determining a calibration RGB difference value corresponding to each pixel point according to the converted RGB value corresponding to each pixel point and a target look-up table includes:

determining a converted gray scale value corresponding to each color channel of the pixel point according to the converted RGB value corresponding to the pixel point:
  determining a high calibration gray scale difference value and a low calibration gray scale difference value corresponding to each color channel according to the converted gray scale value corresponding to each color channel of the pixel point and the target look-up table; and
  determining the high calibration gray scale difference values and the low calibration gray scale difference values corresponding to the plurality of color channels of the pixel point as the calibration RGB difference value corresponding to the pixel point.

Further, the target IP module is specifically a VAC module, and a plurality of sampling gray scale values contained in each color channel and a high calibration gray scale difference value and a low calibration gray scale difference value corresponding to each sampling gray scale value are specifically recorded in the target look-up table. Step 204 of determining a calibration RGB value corresponding to each pixel point according to the converted RGB value and the calibration RGB difference value corresponding to each pixel point includes:

calculating a high calibration gray scale value and a low calibration gray scale value corresponding to each color channel of the pixel point according to the converted gray scale value, the high calibration gray scale difference value and the low calibration gray scale difference value corresponding to each color channel of the pixel point;
  calculating a calibration gray scale value corresponding to each color channel of the pixel point according to the high calibration gray scale value and the low calibration gray scale value corresponding to each color channel of the pixel point; and
  determining the calibration gray scale difference values corresponding to the plurality of color channels of the pixel point as the calibration RGB difference value corresponding to the pixel point.

Examples of the present application provide an image processing device and method. The image processing device provided in the example of the present application includes: an acquisition unit, a first determination unit, a second determination unit, a third determination unit, and an output unit. Firstly, the acquisition unit acquires an image to be displayed. Secondly, the first determination unit determines a converted RGB value corresponding to each pixel point according to an original RGB value corresponding to each pixel point contained in the image to be displayed. Again, the second determination unit determines a calibration RGB difference value corresponding to each pixel point according to the converted RGB value corresponding to each pixel point and a target look-up table. Then, the third determination unit determines a calibration RGB value corresponding to each pixel point according to the converted RGB value and the calibration RGB difference value corresponding to each pixel point. Finally, the output unit outputs and displays the image to be displayed according to the calibration RGB value corresponding to each pixel point. In the examples of the present application, it is not necessary to record a plurality of sampling RGB values and a calibration RGB value corresponding to each sampling RGB value in the target look-up table, but to record a plurality of sampling RGB values and a calibration RGB difference value corresponding to each sampling RGB value, or to record a plurality of sampling gray scale values contained in each color channel and a calibration gray scale difference value corresponding to each sampling gray scale value, or to record a plurality of sampling gray scale values contained in each color channel and a calibration gray scale difference value and a low calibration gray scale difference value corresponding to each sampling gray scale value. A data volume corresponding to any one calibration RGB difference value is related to a specific value of the calibration RGB difference value, a data volume corresponding to any one calibration gray scale difference value is related to the calibration gray scale difference value, a data volume corresponding to any one high calibration gray scale difference value is related to the high calibration gray scale difference value, and a data volume corresponding to any one low calibration gray scale difference value is related to the low calibration gray scale difference value. Therefore, the data volume of the target look-up table can be effectively reduced, whereby the target TCON chip can use a small-capacity RAM to store the target look-up table. Furthermore, the manufacturing cost of the target TCON chip can be effectively reduced.

An example of the present application provides a storage medium, including a stored program. The program, when executed, controls an apparatus where the storage medium is located to perform the image processing method as described above.

The storage medium may include a non-persistent memory, a random access memory (RAM), a non-volatile memory, and/or other forms in a computer-readable medium, such as a read only memory (ROM) or a flash RAM. The memory includes at least one storage chip.

An example of the present application also provides an image processing device, including a storage medium and one or more processors. The storage medium is coupled to the processor, the processor is configured to execute a program instruction stored in the storage medium, and the program instruction, when executed, performs the image processing method as described above.

An example of the present application provides an apparatus, including a processor, a memory, and a program stored on the memory and executed on the processor. The processor, when executing the program, implements the following steps:

acquiring an image to be displayed, the image to be displayed containing a plurality of pixel points;

determining a converted RGB value corresponding to each of the pixel points according to an original RGB value corresponding to each of the pixel points;

determining a calibration RGB difference value corresponding to each of the pixel points according to the converted RGB value corresponding to each of the pixel points and a target look-up table;

determining a calibration RGB value corresponding to each of the pixel points according to the converted RGB value and the calibration RGB difference value corresponding to each of the pixel points; and outputting and displaying the image to be displayed according to the calibration RGB value corresponding to each of the pixel points.

Further, the determining a converted RGB value corresponding to each of the pixel points according to an original RGB value corresponding to each of the pixel points includes:

determining whether color depth conversion processing is required or not according to a color bit depth corresponding to the image to be displayed and a color bit depth corresponding to a target display apparatus, the target display apparatus being a display apparatus where the target TCON chip is located;

if so, calculating the converted RGB value corresponding to each of the pixel points according to a preset algorithm, the color bit depth corresponding to the image to be displayed, the color bit depth corresponding to the target display apparatus, and the original RGB value corresponding to each of the pixel points; and if not, determining the converted RGB value corresponding to each of the pixel points according to the original RGB value corresponding to each of the pixel points.

Further, a plurality of sampling RGB values and a calibration RGB difference value corresponding to each of the sampling RGB values are specifically recorded in the target look-up table. The determining a calibration RGB difference value corresponding to each of the pixel points according to the converted RGB value corresponding to each of the pixel points and a target look-up table includes:

determining whether a target sampling RGB value corresponding to the pixel point exists or not in the target look-up table according to the converted RGB value corresponding to the pixel point;

looking up the target look-up table for a calibration RGB difference value corresponding to the target sampling RGB value if the target sampling RGB value corresponding to the pixel point exists; and determining the calibration RGB difference value corresponding to the target sampling RGB value as a calibration RGB difference value corresponding to the pixel point.

Further, the determining a calibration RGB difference value corresponding to each of the pixel points according to the converted RGB value corresponding to each of the pixel points and a target look-up table also includes:

looking up the target look-up table for a calibration RGB difference value corresponding to a first adjacent sampling RGB value and a calibration RGB difference value corresponding to a second adjacent sampling RGB value if the target sampling RGB value corresponding to the pixel point does not exist, the first adjacent sampling RGB value being a sampling RGB value, smaller than but closest to the converted RGB value corresponding to the pixel point, among the plurality of sampling RGB values, and the second adjacent sampling RGB value being a sampling RGB value, greater than but closest to the converted RGB value corresponding to the pixel point, among the plurality of sampling RGB values; and determining the calibration RGB difference value corresponding to the first adjacent sampling RGB value and the calibration RGB difference value corresponding to the second adjacent sampling RGB value as the calibration RGB difference value corresponding to the pixel point.

Further, the determining a calibration RGB value corresponding to each of the pixel points according to the converted RGB value and the calibration RGB difference value corresponding to each of the pixel points includes:

calculating a calibration RGB value corresponding to the pixel point according to the converted RGB value corresponding to the pixel point and the calibration RGB difference value corresponding to the target sampling RGB value when the calibration RGB difference value corresponding to the pixel point is specifically the calibration RGB difference value corresponding to the target sampling RGB value.

Further, the determining a calibration RGB value corresponding to each of the pixel points according to the converted RGB value and the calibration RGB difference value corresponding to each of the pixel points includes:

calculating a calibration RGB value corresponding to the first adjacent sampling RGB value according to the first adjacent sampling RGB value and the calibration RGB difference value corresponding to the first adjacent sampling RGB value when the calibration RGB difference value corresponding to the pixel point is specifically the calibration RGB difference value corresponding to the first adjacent sampling RGB value and the calibration RGB difference value corresponding to the second adjacent sampling RGB value;

calculating a calibration RGB value corresponding to the second adjacent sampling RGB value according to the second adjacent sampling RGB value and the calibration RGB difference value corresponding to the second adjacent sampling RGB value; and calculating a calibration RGB value corresponding to the pixel point according to the preset algorithm, the converted RGB value corresponding to the pixel point, the first adjacent sampling RGB value, the calibration RGB value corresponding to the first adjacent sampling RGB value, the second adjacent sampling RGB value, and the calibration RGB value corresponding to the second adjacent sampling RGB value.

Further, a plurality of sampling gray scale values contained in each color channel and a calibration gray scale difference value corresponding to each of the sampling gray scale values are specifically recorded in the target look-up table. The determining a calibration RGB difference value corresponding to each of the pixel points according to the converted RGB value corresponding to each of the pixel points and a target look-up table includes:

determining a converted gray scale value corresponding to each color channel of the pixel point according to the converted RGB value corresponding to the pixel point;

determining a calibration gray scale difference value corresponding to each color channel according to the converted gray scale value corresponding to each color channel of the pixel point and the target look-up table; and determining the calibration gray scale difference values corresponding to the plurality of color channels of the pixel point as the calibration RGB difference value corresponding to the pixel point.

Further, the determining a calibration RGB value corresponding to each of the pixel points according to the converted RGB value and the calibration RGB difference value corresponding to each of the pixel points includes:

calculating a calibration gray scale value corresponding to each color channel of the pixel point according to the converted gray scale value and the calibration gray scale difference value corresponding to each color channel of the pixel point; and determining the calibration gray scale values corresponding to the plurality of color channels of the pixel point as the calibration RGB value corresponding to the pixel point.

Further, a plurality of sampling gray scale values contained in each color channel and a high calibration gray scale difference value and a low calibration gray scale difference value corresponding to each of the sampling gray scale values are specifically recorded in the target look-up table. The determining a calibration RGB difference value corresponding to each of the pixel points according to the converted RGB value corresponding to each of the pixel points and a target look-up table includes:

determining a converted gray scale value corresponding to each color channel of the pixel point according to the converted RGB value corresponding to the pixel point;

determining a high calibration gray scale difference value and a low calibration gray scale difference value corresponding to each color channel according to the converted gray scale value corresponding to each color channel of the pixel point and the target look-up table; and determining the high calibration gray scale difference values and the low calibration gray scale difference values corresponding to the plurality of color channels of the pixel point as the calibration RGB difference value corresponding to the pixel point.

Further, the determining a calibration RGB value corresponding to each of the pixel points according to the converted RGB value and the calibration RGB difference value corresponding to each of the pixel points includes:

calculating a high calibration gray scale value and a low calibration gray scale value corresponding to each color channel of the pixel point according to the converted gray scale value, the high calibration gray scale difference value and the low calibration gray scale difference value corresponding to each color channel of the pixel point;

calculating a calibration gray scale value corresponding to each color channel of the pixel point according to the high calibration gray scale value and the low calibration gray scale value corresponding to each color channel of the pixel point; and determining the calibration gray scale values corresponding to the plurality of color channels of the pixel point as the calibration RGB value corresponding to the pixel point.

The present application also provides a computer program product that, when executed on a data processing apparatus, is adapted to execute a program code for initializing the following method steps: acquiring an image to be displayed, the image to be displayed containing a plurality of pixel points; determining a converted RGB value corresponding to each of the pixel points according to an original RGB value corresponding to each of the pixel points; determining a calibration RGB difference value corresponding to each of the pixel points according to the converted RGB value corresponding to each of the pixel points and a target look-up table; determining a calibration RGB value corresponding to each of the pixel points according to the converted RGB value and the calibration RGB difference value corresponding to each of the pixel points; and outputting and displaying the image to be displayed according to the calibration RGB value corresponding to each of the pixel points.

Those skilled in the art will appreciate that the examples of the present application may be provided as a method, a system, or a computer program product. Therefore, the present application may take the form of an entirely hardware example, an entirely software example, or an example combining software and hardware. Furthermore, the present application may take the form of a computer program product implemented on one or more computer available storage media (including, but not limited to, a disk memory, a CD-ROM, an optical memory, etc.) containing computer available program codes.

The present application is described with reference to flowcharts and/or block diagrams of the method, the apparatus (system), and the computer program product according to the examples of the present application. It should be understood that each flow and/or block in the flowcharts and/or the block diagrams and a combination of the flows and/or the blocks in the flowcharts and/or the block diagrams may be implemented by computer program instructions. These computer program instructions may be provided for a general-purpose computer, a special-purpose computer, an embedded processor, or a processor of another programmable data processing apparatus to generate a machine, whereby a device for achieving functions designated in one or more flows of the flowcharts and/or one or more blocks of the block diagrams is generated via instructions executed by the computers or the processor of the other programmable data processing apparatus.

These computer program instructions may also be stored in a computer-readable memory capable of guiding the computers or the other programmable data processing apparatus to operate in a specific manner, whereby a manufactured product including an instruction device is generated via the instructions stored in the computer readable memory, and the instruction device achieves the functions designated in one or more flows of the flowcharts and/or one or more blocks of the block diagrams.

These computer program instructions may also be loaded to the computers or the other programmable data processing apparatus, whereby processing implemented by the computers is generated by executing a series of operation steps on the computers or the other programmable apparatus. Thus, the instructions executed on the computers or the other programmable apparatus provide a step of achieving the functions designated in one or more flows of the flowcharts and/or one or more blocks of the block diagrams.

In a typical configuration, a computing apparatus includes one or more central processing units (CPUs), an input/output interface, a network interface, and a memory.

The memory may include a non-persistent memory, a random access memory (RAM), a non-volatile memory, and/or other forms in a computer-readable medium, such as a read only memory (ROM) or a flash RAM. The memory is an example of a computer-readable medium.

The computer-readable medium includes non-volatile and volatile, removable and non-removable media. Information may be stored in any way or by any technology. Information may be computer-readable instructions, data structures, modules of programs, or other data. Examples of a computer storage medium include, but are not limited to, a phase-change random access memory (PRAM), a static random access memory (SRAM), a dynamic random access memory (DRAM), other types of random access memories (RAM), a read only memory (ROM), an electrically erasable programmable read-only memory (EEPROM), a flash memory or other memory technologies, a compact disc-read only memory (CD-ROM), a digital versatile disc (DVD) or other optical memories, a cassette tape, a tape and disk memory or other magnetic memories or any other non-transport media. The non-volatile storage medium may be configured to store information that may be accessed by a computing apparatus. As defined herein, the computer-readable medium does not include computer-readable transitory media, such as modulated data signals and carrier waves.

It should also be noted that the terms "including", "containing" or any other variations thereof are intended to cover a non-exclusive inclusion. Thus, a process, method, article, or apparatus including a series of elements not only includes those elements, but also includes other elements that are not explicitly listed, or also includes elements inherent to such process, method, article, or apparatus. It is not excluded, without more constraints, that additional identical elements exist in the process, method, article, or apparatus including elements defined by a statement "including a . . . ".

Those skilled in the art will appreciate that the examples of the present application may be provided as a method, a system, or a computer program product. Therefore, the present application may take the form of an entirely hardware example, an entirely software example, or an example combining software and hardware. Furthermore, the present application may take the form of a computer program product implemented on one or more computer available storage media (including, but not limited to, a disk memory, a CD-ROM, an optical memory, etc.) containing computer available program codes.

The above is merely the examples of the present application and is not intended to limit the present application. Various modifications and variations of the present application will occur to those skilled in the art. Any modifications, equivalent replacements, improvements, etc. that come within the spirit and principles of the present application are intended to be within the scope of the claims appended hereto.

The invention claimed is:

1. An image color calibration processing device applied to a target TCON (Timing controller) chip, comprising:
an acquisition circuit, configured to acquire an image to be displayed, the image to be displayed containing a plurality of pixel points;
a first determination circuit, configured to determine a converted RGB value corresponding to each of the plurality of pixel points according to an original RGB value corresponding to each of the plurality of pixel points;
a second determination circuit, configured to determine a calibration RGB difference value corresponding to each of the plurality of pixel points according to the converted RGB value corresponding to each of the plurality of pixel points and a target look-up table;

a third determination circuit, configured to determine a calibration RGB value corresponding to each of the plurality of pixel points according to the converted RGB value and the calibration RGB difference value corresponding to each of the plurality of pixel points; and an output circuit, configured to output and display the image to be displayed according to the calibration RGB value corresponding to each of the plurality of pixel points.

2. The device according to claim 1, wherein the first determination circuit comprises:

a first determination module, configured to determine whether color depth conversion processing is required or not according to a color bit depth corresponding to the image to be displayed and a color bit depth corresponding to a target display apparatus, the target display apparatus being a display apparatus where the target TCON chip is located;

a calculation module, configured to calculate the converted RGB value corresponding to each of the plurality of pixel points according to a preset algorithm, the color bit depth corresponding to the image to be displayed, the color bit depth corresponding to the target display apparatus, and the original RGB value corresponding to each of the plurality of pixel points when the first determination module determines that color depth conversion processing is required; and a second determination module, configured to determine the original RGB value corresponding to each of the plurality of pixel points as the converted RGB value corresponding to each of the plurality of pixel points when the first determination module determines that color depth conversion processing is not required.

3. The device according to claim 1, wherein a plurality of sampling RGB values and a calibration RGB difference value corresponding to each of the sampling RGB values are specifically recorded in the target look-up table;

the second determination circuit is specifically configured to:

determine whether a target sampling RGB value corresponding to the pixel point exists or not in the target look-up table according to the converted RGB value corresponding to the pixel point;

look up the target look-up table for a calibration RGB difference value corresponding to the target sampling RGB value if the target sampling RGB value corresponding to the pixel point exists; and determine the calibration RGB difference value corresponding to the target sampling RGB value as a calibration RGB difference value corresponding to the pixel point.

4. The device according to claim 3, wherein the second determination circuit is also specifically configured to:

look up the target look-up table for a calibration RGB difference value corresponding to a first adjacent sampling RGB value and a calibration RGB difference value corresponding to a second adjacent sampling RGB value if the target sampling RGB value corresponding to the pixel point does not exist, the first adjacent sampling RGB value being a sampling RGB value, smaller than but closest to the converted RGB value corresponding to the pixel point, among the plurality of sampling RGB values, and the second adjacent sampling RGB value being a sampling RGB value, greater than but closest to the converted RGB value corresponding to the pixel point, among the plurality of sampling RGB values; and determine the calibration RGB difference value corresponding to the first adjacent sampling RGB value and the calibration RGB difference value corresponding to the second adjacent sampling RGB value as the calibration RGB difference value corresponding to the pixel point.

5. The device according to claim 4, wherein the third determination circuit is also specifically configured to:

calculate a calibration RGB value corresponding to the first adjacent sampling RGB value according to the first adjacent sampling RGB value and the calibration RGB difference value corresponding to the first adjacent sampling RGB value when the calibration RGB difference value corresponding to the pixel point is specifically the calibration RGB difference value corresponding to the first adjacent sampling RGB value and the calibration RGB difference value corresponding to the second adjacent sampling RGB value;

calculate a calibration RGB value corresponding to the second adjacent sampling RGB value according to the second adjacent sampling RGB value and the calibration RGB difference value corresponding to the second adjacent sampling RGB value; and calculate a calibration RGB value corresponding to the pixel point according to the preset algorithm, the converted RGB value corresponding to the pixel point, the first adjacent sampling RGB value, the calibration RGB value corresponding to the first adjacent sampling RGB value, the second adjacent sampling RGB value, and the calibration RGB value corresponding to the second adjacent sampling RGB value.

6. The device according to claim 3, wherein the third determination circuit is specifically configured to:

calculate a calibration RGB value corresponding to the pixel point according to the converted RGB value corresponding to the pixel point and the calibration RGB difference value corresponding to the target sampling RGB value when the calibration RGB difference value corresponding to the pixel point is specifically the calibration RGB difference value corresponding to the target sampling RGB value.

7. The device according to claim 1, wherein a plurality of sampling gray scale values contained in each color channel and a calibration gray scale difference value corresponding to each of the sampling gray scale values are specifically recorded in the target look-up table;

the second determination circuit is specifically configured to:

determine a converted gray scale value corresponding to each color channel of the pixel point according to the converted RGB value corresponding to the pixel point;

determine a calibration gray scale difference value corresponding to each color channel according to the converted gray scale value corresponding to each color channel of the pixel point and the target look-up table; and determine the calibration gray scale difference values corresponding to the plurality of color channels of the pixel point as the calibration RGB difference value corresponding to the pixel point.

8. The device according to claim 7, wherein the third determination circuit is specifically configured to:

calculate a calibration gray scale value corresponding to each color channel of the pixel point according to the converted gray scale value and the calibration gray scale difference value corresponding to each color channel of the pixel point; and determine the calibration gray scale values corresponding to the plurality of color channels of the pixel point as the calibration RGB value corresponding to the pixel point.

9. The device according to claim 1, wherein a plurality of sampling gray scale values contained in each color channel and a high calibration gray scale difference value and a low calibration gray scale difference value corresponding to each of the sampling gray scale values are specifically recorded in the target look-up table;

the second determination circuit is specifically configured to:

determine a converted gray scale value corresponding to each color channel of the pixel point according to the converted RGB value corresponding to the pixel point;

determine a high calibration gray scale difference value and a low calibration gray scale difference value corresponding to each color channel according to the converted gray scale value corresponding to each color channel of the pixel point and the target look-up table; and determine the high calibration gray scale difference values and the low calibration gray scale difference values corresponding to the plurality of color channels of the pixel point as the calibration RGB difference value corresponding to the pixel point.

10. The device according to claim 9, wherein the third determination circuit is specifically configured to:

calculate a high calibration gray scale value and a low calibration gray scale value corresponding to each color channel of the pixel point according to the converted gray scale value, the high calibration gray scale difference value and the low calibration gray scale difference value corresponding to each color channel of the pixel point;

calculate a calibration gray scale value corresponding to each color channel of the pixel point according to the high calibration gray scale value and the low calibration gray scale value corresponding to each color channel of the pixel point; and determine the calibration gray scale values corresponding to the plurality of color channels of the pixel point as the calibration RGB value corresponding to the pixel point.

11. A timing control device, comprising: the image color calibration processing device according to claim 1.

12. A display device, comprising: the timing control device according to claim 11.

13. An image color calibration processing method applied to a target TCON (Timing controller) chip, comprising:

acquiring an image to be displayed, the image to be displayed containing a plurality of pixel points;

determining a converted RGB value corresponding to each of the plurality of pixel points according to an original RGB value corresponding to each of the plurality of pixel points;

determining a calibration RGB difference value corresponding to each of the plurality of pixel points according to the converted RGB value corresponding to each of the plurality of pixel points and a target look-up table;

determining a calibration RGB value corresponding to each of the plurality of pixel points according to the converted RGB value and the calibration RGB difference value corresponding to each of the plurality of pixel points; and outputting and displaying the image to be displayed according to the calibration RGB value corresponding to each of the plurality of pixel points.

14. A storage medium, comprising a stored program, wherein the program, when executed, controls an apparatus where the storage medium is located to perform the image color calibration processing method according to claim 13.

15. An image color calibration processing device, comprising a storage medium and one or more processors, wherein the storage medium is coupled to the one or more processor, the one or more processor is configured to execute a program instruction stored in the storage medium, and the program instruction, when executed, performs the image color calibration processing method according to claim 13.

* * * * *